(12) United States Patent
McMillan et al.

(10) Patent No.: US 6,762,713 B1
(45) Date of Patent: Jul. 13, 2004

(54) DEVICE AND METHOD FOR DETERMINING ALL COMPONENTS OF THE STOKES POLARIZATION VECTOR WITH A RADAR SIGNAL

(75) Inventors: Robert W. McMillan, Owens Cross Roads, AL (US); Michael J. Dorsett, Huntsville, AL (US); Thomas K. Hamilton, Huntsville, AL (US); John H. Hennings, Huntsville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/341,151

(22) Filed: Jan. 13, 2003

(51) Int. Cl.[7] ............................................. G01S 7/42
(52) U.S. Cl. ...................................................... 342/188
(58) Field of Search ................................ 342/188, 162, 342/192, 194, 195

(56) References Cited

U.S. PATENT DOCUMENTS

| | | | |
|---|---|---|---|
| 4,849,762 A | * 7/1989 | Barnes | ........................ 342/188 |
| 5,552,787 A | * 9/1996 | Schuler et al. | ............... 342/188 |
| 5,608,413 A | 3/1997 | Macdonald | |
| 5,764,182 A | 6/1998 | Durand | |
| 5,793,905 A | 8/1998 | Maier et al. | |
| 5,815,121 A | 9/1998 | Collier | |
| 5,890,095 A | 3/1999 | Barbour et al. | |
| 6,043,887 A | 3/2000 | Allard et al. | |
| 6,118,537 A | 9/2000 | Johs et al. | |
| 6,490,043 B1 | 12/2002 | Kebabian | |

OTHER PUBLICATIONS

Innarilli et al., "Polarimetrtic–Spectral Intensity Modulation (P–SIM) . . . Imaging", SPIE Conference, Orlando, FL, Apr. 1999.

Oka, K. and Kato, T. "Spectroscopic Polarimetry . . . Specttrum", Optics Letters, Nov. 1, 1999, vol. 24.

Sabatke et al, "Optimization of Retardance . . . Polarimeter", Optics Letters, vol. 25, No. 11, Jun. 1, 2000.

Goldsmith, P., "Quasioptical Systems", IEEE Press, pp. 71–77.

Born, M. and Wolf, E., "Principles of Optics", Pergamon Press pp. 30–32 and 554–555.

McMillan et al., "An Experimental 225 GHz Pulsed Coherent Radar", Transactions on Microwave Theory and Techniques, Mar. 1991.

Gribbin, J. "Schrodinger's Kittens . . . Reality", pp. 109–115.

Sabatke et al., "A Snapshot Imaging Spectropolarimeter", Procee. of the Multi/Hyperspectral Sensors . . . Workshop, Red Ars. Nov. 7–9, 2000.

* cited by examiner

*Primary Examiner*—Daniel Pihulic
(74) *Attorney, Agent, or Firm*—Roger C. Phillips (57) ABSTRACT

A polarimeter for measuring the polarization state of a wideband electromagnetic signal. The polarimeter includes a first antenna for receiving the electromagnetic signal and a modulator. The modulator is interconnected with the first antenna for modulating the electromagnetic signal whereby a modulated electromagnetic signal results which contains a different polarization state for each frequency of the electromagnetic signal and wherein the amplitude of each frequency component of the modulated electromagnetic signal is a function of the particular polarization state of each frequency component of the electromagnetic signal. Also, the modulator may be configured to modulate at a radar frequency. A linear polarizer is also provided which may be configured to pass a first predetermined polarization of the modulated electromagnetic signal through a first output thereof. Further, a first receiver is provided which includes a detector for receiving and demodulating the modulated electromagnetic signal from the linear polarizer.

21 Claims, 5 Drawing Sheets

DEVICE AND METHOD FOR DETERMINING ALL COMPONENTS OF THE STOKES POLARIZATION VECTOR WITH A RADAR SIGNAL

BACKGROUND OF THE INVENTION

1. Field of the Invention

The present invention relates to devices and methods for identifying state of polarization of an electromagnetic wave and, more particularly, to applications where an identification of a state of polarization of an electromagnetic wave are employed, such as for target discrimination.

2. Related Art

Identifying the state of polarization of an electromagnetic wave by determining the Stokes polarization vector components of the wave is known. In particular, an electromagnetic wave, such as a spectral band of light, may be characterized as having four Stokes vector components ($s_0, s_1, s_2$, and $s_3$). The component $s_0$ is proportional to the intensity of the wave. The components $s_1$, $s_2$, and $s_3$ may be related to the orientation of the polarization, e.g., an ellipse and its ellipticity. In general, the orientation of polarization of a plane (planar phase front) monochromatic (single frequency) wave is elliptical. However, the ellipse may degenerate into a straight line in the case of linear polarization, and for circular polarization, the ellipse may degenerate into a circle.

An elliptically-polarized wave can be considered as the superposition of two waves of arbitrary orthogonal (perpendicular) polarization and amplitude $a_1$ and $a_2$ with phase difference $\delta$. In this case, the components of a Stokes polarization vector ($s_0$, $s_1$, $s_2$, and $s_3$) may be equated to amplitude ($a_1$ and $a_2$) and phase difference ($\delta$) as provided in the Table below:

TABLE $s_0 = a_1^2 + a_2^2$,
$s_1 = a_1^2 - a_2^2$,
$s_2 = 2a_1 a_2 \cos\delta$,
$s_3 = 2a_1 a_2 \sin\delta$.

Accordingly, based on the equations given above, the Stokes vector is known if the parameters $a_1$, $a_2$, and $\delta$ are known. For further details concerning the Stokes polarization vector the reader is referred to the *Principles of Optics*, 3rd Edition, by M. Born and E. Wolf, Pergamon Press, Oxford, 1965, Chapter 1 which is incorporated herein by reference to the extent necessary to make and practice the present invention.

One way of measuring the Stokes vector components ($s_0$, $s_1$, $s_2$, and $s_3$) is to place two polarizers and a retarder in the optical path sequentially. Insertion of a first polarizer into an optical path gives a measure of one of the linear polarizations and a second polarizer is also inserted to give the other linear polarization. A retarder is further inserted into the optical path to retard a signal having a given sense of polarization in phase relative to a signal having another sense, where the two senses are generally orthogonal to each other. Output from the retarder is a signal containing data that can be used to calculate $\delta$ when the linear components are known. The disadvantage of this approach is that it involves moving parts, since these optical components must be placed successively in the optical path. Also, in a dynamic scene, a polarimeter using moving parts would give smeared results, since the scene could change during the times that the polarizers are being changed.

Other ways of measuring the Stokes vector components have been proposed. For example, the paper entitled "Spectroscopic Polarimetry with a Channeled Spectrum" by Kazuhiko Oka and Takayuki Kato, published in *Optics Letters*, Vol. 24, No. 21, Nov. 1, 1999 describes a system for spectropolarimetry which eliminates the need for inserting and removing polarizers into or out of the optical path. In particular, Oka and Kato employ a pair of birefringent retarders and an analyzer to modulate light so that the state of polarization of the light varies with frequency. The modulated light is then passed to a spectrometer or spectrum analyzer and then to a computer where, through Fourier analysis, the state of polarization of the modulated light is determined.

It is also known that light reflected or emitted from a man-made object will generally have a different polarization signature from light reflected or emitted from a natural background. For example, unpolarized light incident on a flat surface will have much of its vertical component absorbed and its horizontal component reflected. However, to date, no suitable device or method of measuring a complete polarization signature of a target scene with no moving parts is available.

SUMMARY OF THE INVENTION

In accordance with an embodiment of the present invention, a polarimeter is provided for measuring the polarization state of a wideband electromagnetic signal. The polarimeter includes a first antenna for receiving the electromagnetic signal and a modulator. The modulator is interconnected with the first antenna for modulating the electromagnetic signal whereby a modulated electromagnetic signal results which contains a different polarization state for each frequency of the electromagnetic signal and wherein the amplitude of each frequency component of the modulated electromagnetic signal is a function of the particular polarization state of each frequency component of the electromagnetic signal. Also, the modulator may be configured to modulate at a radar frequency. A linear polarizer is also provided which may be configured to pass a first predetermined polarization of the modulated electromagnetic signal through a first output thereof. Further, a first receiver is provided which includes a detector for receiving and demodulating the modulated electromagnetic signal from the linear polarizer.

In accordance with another aspect of the present invention, a target discriminator for measuring the polarimetry of a wideband electromagnetic signal reflected from a target is provided. The target discriminator may comprise a first antenna for receiving the electromagnetic signal and a modulator interconnected with the first antenna for modulating the electromagnetic signal. The modulator may comprise a first optically thick retarder of birefringent material wherein a fast and a slow axes of the first retarder define respective x and y axes of a rectangular coordinate system. The modulator may also comprise a second optically thick retarder of birefringent material and wherein the fast axis of the first optically thick retarder forms an angle of approximately forty-five degrees to the fast axis of the second optically thick retarder. A linear polarizer may be configured to pass a first predetermined polarization of the modulated electromagnetic signal through a first output thereof and to pass a second predetermined polarization of the modulated electromagnetic signal through a second output thereof. A first receiver may be provided which comprises a detector for receiving and demodulating the modulated electromagnetic signal from the linear polarizer. An analog to digital converter may be connected to the detector for converting the modulated electromagnetic signal into a digital word. A processor may be further provided and the processor may be configured to receive the digital word and calculate at least one component of a Stokes polarization vector of the electromagnetic signal and wherein the processor further calculates a degree of depolarization of the electromagnetic signal identifiable as a target signature. The target discriminator may further comprise a transmitter for transmitting the electromagnetic signal, a second receiver employed to receive the second predetermined polarization of the modulated electromagnetic signal and a power combiner that is employed to combine the modulated electromagnetic signal received by each of the first and second receivers.

In accordance with a further aspect of the present invention, a polarimeter for measuring the polarization state of a wideband electromagnetic signal is provided, the polarimeter may comprise means for receiving the electromagnetic signal; means for modulating the electromagnetic signal being interconnected with the receiving means whereby a modulated electromagnetic signal results which contains a different polarization state for each frequency of the electromagnetic signal with the amplitude of each frequency component of the modulated electromagnetic signal being a function of the particular polarization state of each frequency component of the electromagnetic signal, the modulator being configured to modulate at a microwave frequency; means for linearly polarizing the modulated electromagnetic signal; and means for demodulating the modulated electromagnetic signal output from the linear polarizer.

In yet a further aspect of the present invention, a method for measuring the polarization state of a wideband electromagnetic signal, the method comprises receiving the electromagnetic signal; modulating the electromagnetic signal to obtain a modulated electromagnetic signal containing a different polarization state for each frequency of the electromagnetic signal with the amplitude of each frequency component of the modulated electromagnetic signal being a function of the particular polarization state of each frequency component of the electromagnetic signal, the electromagnetic signal being modulated at a microwave frequency; linearly polarizing the modulated electromagnetic signal; and demodulating the modulated electromagnetic signal output from the linear polarizer.

BRIEF DESCRIPTION OF THE DRAWINGS

Other objects and advantages of the invention will be evident to one of ordinary skill in the art from the following detailed description made with reference to the accompanying drawings, in which.

DETAILED DESCRIPTION OF THE PREFERRED EMBODIMENT

One embodiment of the present invention concerns a device and a method for determining all four components of the Stokes polarization vector within a radar return signal in just one radar coherent processing interval. This approach is based on the principle that a broadband electromagnetic wave propagating through cascaded birefringent elements has different polarization vectors rotated by differing amounts depending on the original state of polarization. If the resulting or modulated signal is then propagated through a linear polarizer serving as an analyzer, a spectrum results that is a function of polarization state relative to frequency. If this spectrum is subjected to a Fourier transform operation, a signal whose polarization (Stokes) components are separated in frequency results. The Stokes components may then be separated by using a frequency sensitive device such as a bandpass filter. Wide or broad bandwidth is achieved by either sweeping the signal linearly in frequency over a range corresponding to the bandwidth or by stepping the frequency change in small steps so as to approximate a linear sweep. If the frequency change is linear, the spectrum is swept out linearly in a time equal to the period of the swept waveform. If the frequency is stepped, a point on the spectrum is generated corresponding to each incremental frequency. Accordingly, it is possible to separate these Stokes components using only one radar receiver instead of the three that would be normally required for such an operation in previously available devices. Also, the addition of a second receiver provides the means to process the radar signal using standard methods to extract range, Doppler, and other parameters normally measured by a standard radar and known to those of ordinary skill in the relevant art.

It will be understood that the polarization information determined in accordance with this embodiment of the present invention may be used as a discriminant for target detection that advantageously does not affect normal radar operation. In accordance with an aspect of the present invention, a device and method is provided for determining the components of the Stokes polarization vector for both radar (active) and radiometer (passive) systems.

A radiometer signal is inherently broadband, equal to the bandwidth of the radiometer receiver, and all frequencies in the band are received at once. In accordance with an embodiment of the present invention, the radiation received by a radiometer may be continuous wave (CW) and may be separated into its individual frequency components by being placed into frequency bins by the microwave or millimeter wave receiver whereby the receiver omits the need for a spectrometer and is able to resolve narrow spectral bands with high resolution. Also, it will be appreciated that the electromagnetic signal sent by the radar may be pulsed.

The present invention provides, in one aspect, for the effective discrimination of targets from clutter because it has been found that man-made objects, and some natural objects, reflect light, or electromagnetic radiation of any wavelength, with some polarization effects as described above.

Figure 1:
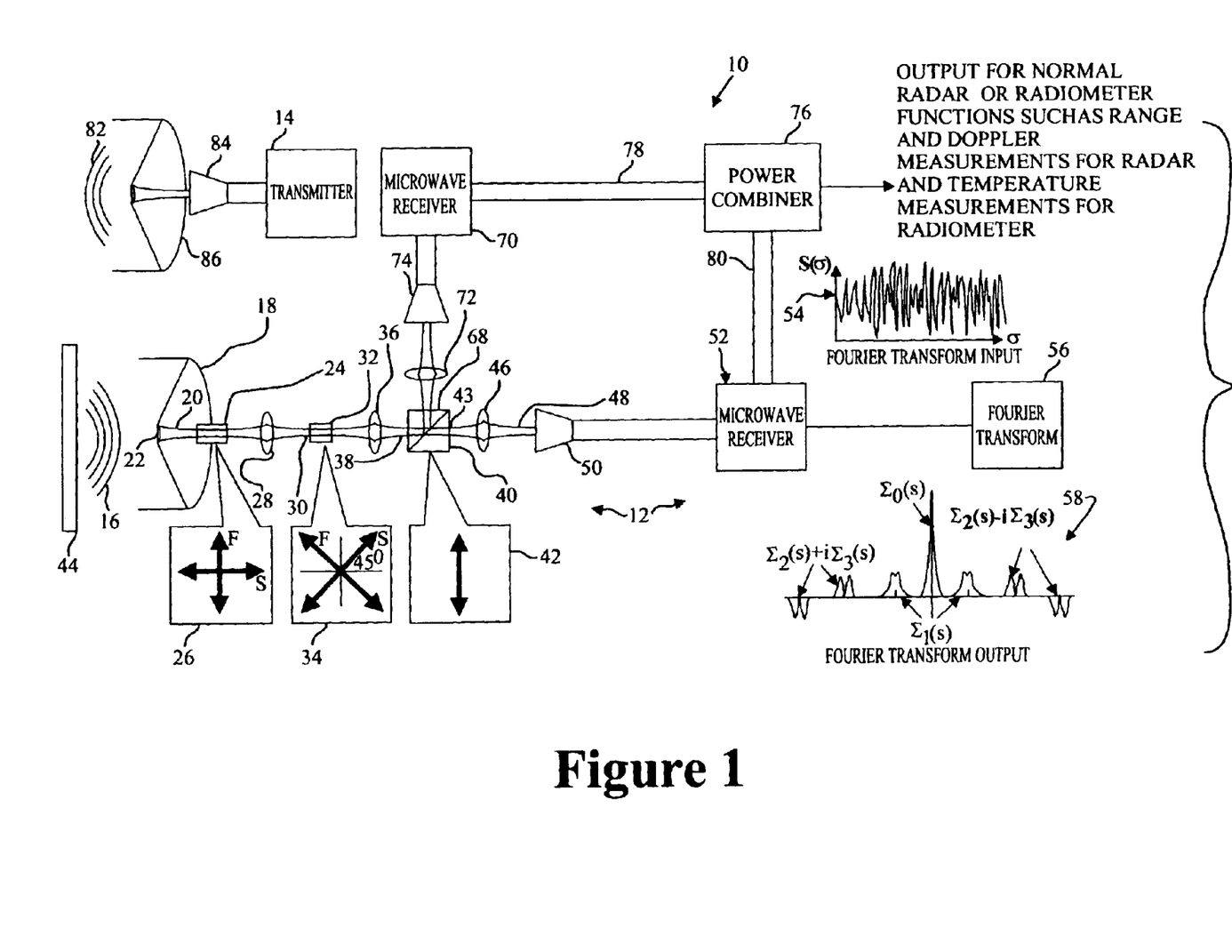
FIG. 1 is a diagrammatical view illustrating a polarimeter in accordance with one embodiment of the present invention wherein the polarimeter comprises a radiometer and a transmitter having a separate antenna, a Fourier transform input graph and Fourier transform output graph are also shown.

Referring now to FIG. 1, a polarimeter in accordance with one embodiment of the present invention is illustrated generally at 10. In this embodiment, the polarimeter 10 comprises a passive radiometer 12 which may be employed in connection with a transmitter 14 to form a bistatic radar.

The radiometer 12 preferably may be configured to receive a wide or broadband electromagnetic radiation or signal 16 in the microwave or millimeter wavelengths. The broadband signal 16 of arbitrary polarization emitted or reflected from a target scene within the field of view of the radiometer antenna may be collected by an antenna 18 and focused to a beam waist 20 along a focal plane by a reflector 22.

The antenna 18 preferably comprises a Cassegrain antenna, although it will be understood that an antenna such as a parabolic reflector or lens antenna may be employed in accordance with the present invention. Accordingly, it will be understood that the term "antenna" as used herein may Include any structure for receiving or collecting electromagnetic energy including those having one or more lenses. A Cassegrain antenna may be obtained from AdComm Inc. of Hackensack, N.J.

It will be appreciated that the beam waist 20 may be formed when a converging or convex lens is used to focus a plane wave of an electromagnetic signal or radiation. At microwave and millimeter wavelengths, diffraction effects are strong, and the focal point becomes a waist, which is the narrowest point of the beam. In conventional optics, rather than forming a beam waist, a point is formed because the effects of optical diffraction are ignored.

A retarder 24, made of a birefringent material suitable for microwave or millimeter wave radiation and described in more detail below, may be placed at a center of the beam waist 20 with its fast (F) and slow (S) retardation axes oriented as shown at 26. As is known, a birefringent material is defined as one through which an electromagnetic signal propagates at different velocities depending on the polarization of the signal. Accordingly, it will be appreciated that a horizontally-polarized component of an input signal will be retarded in time or phase relative to a vertically-polarized component thereby resulting in a rotation of the polarization vector of the input signal. Of course the use of the terms horizontal and vertical above is merely for clarity in the present description and it will be understood that each component is orthogonal to the other and not necessarily horizontal or vertical.

The signal output from the retarder 24 may be collected by a lens 28 that re-focuses the signal to another beam waist 30 at which a second retarder 32 is placed. The lens 28 may be composed of any suitable material but preferably comprises a plastic material that is transparent to the wavelengths of interest. One suitable material has been found to be sold under the mark TPX which is composed of a poly4-methyl-pentene-1 plastic or the mark Rexolite which is composed of a cross-linked polystyrene. The lens 28 may be machined on a lathe with a hyperbolic shape that minimizes spherical aberrations such as described in *Quasioptical Systems*, by Paul Goldsmith, IEEE Press, New York, 1997, Chapter 5.

It is advantageous to match optical elements so that reflections do not occur when radiation is incident on an element from another medium of differing refractive index. An example of this type of matching includes the use of coatings placed on binocular and camera lenses to minimize reflection losses. At microwave and millimeter wavelengths this problem is more difficult and to obtain a good match, it would be necessary to coat the optical element with a transparent material having an index of refraction equal to the square root of the ratio of the indices of the two media to be matched and having an optical thickness of one quarter-wave in the medium being coated or matched. When considering a wavelength at X-band, for example of 3 cm, a coating thickness of several millimeters in thickness may be required. Such a coating thickness may be impractical to apply.

Figure 4:
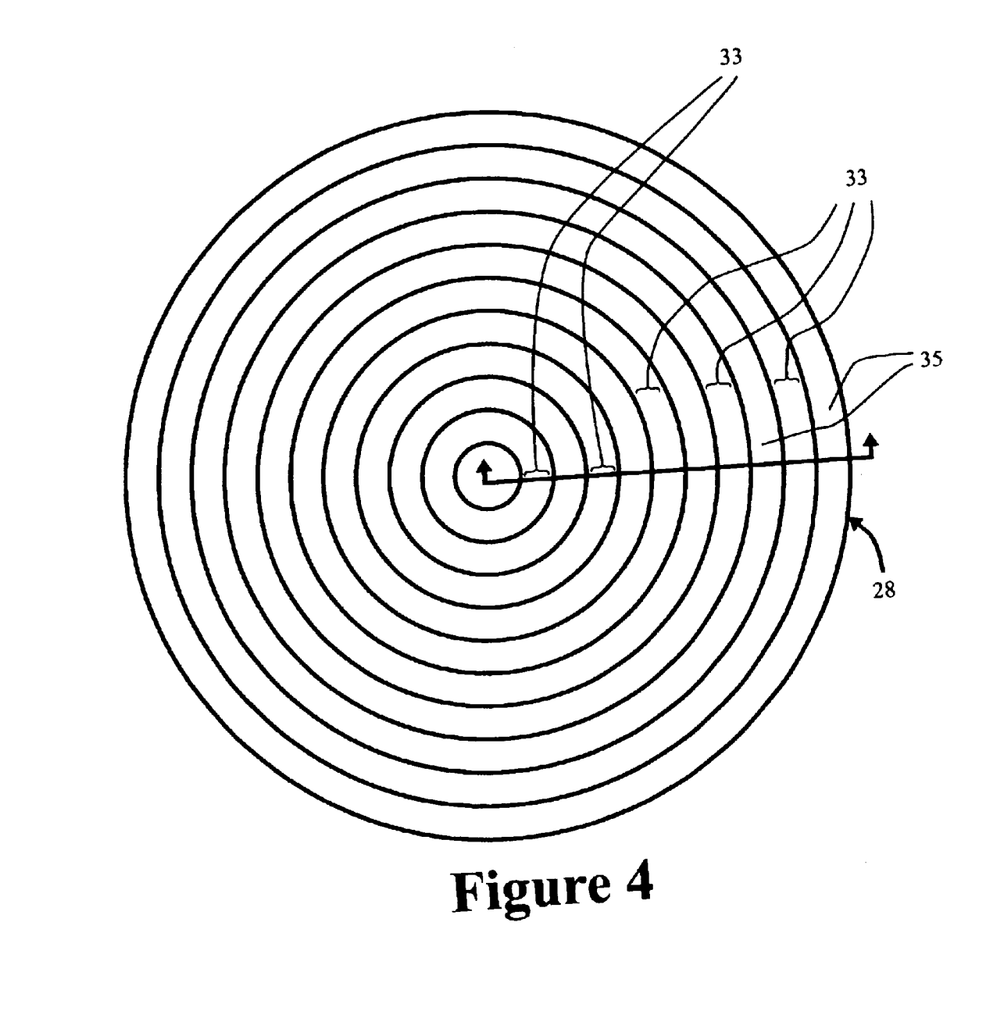
FIG. 4 is top plan view of a lens that may be used in the practice of the present invention.
Figure 4A:
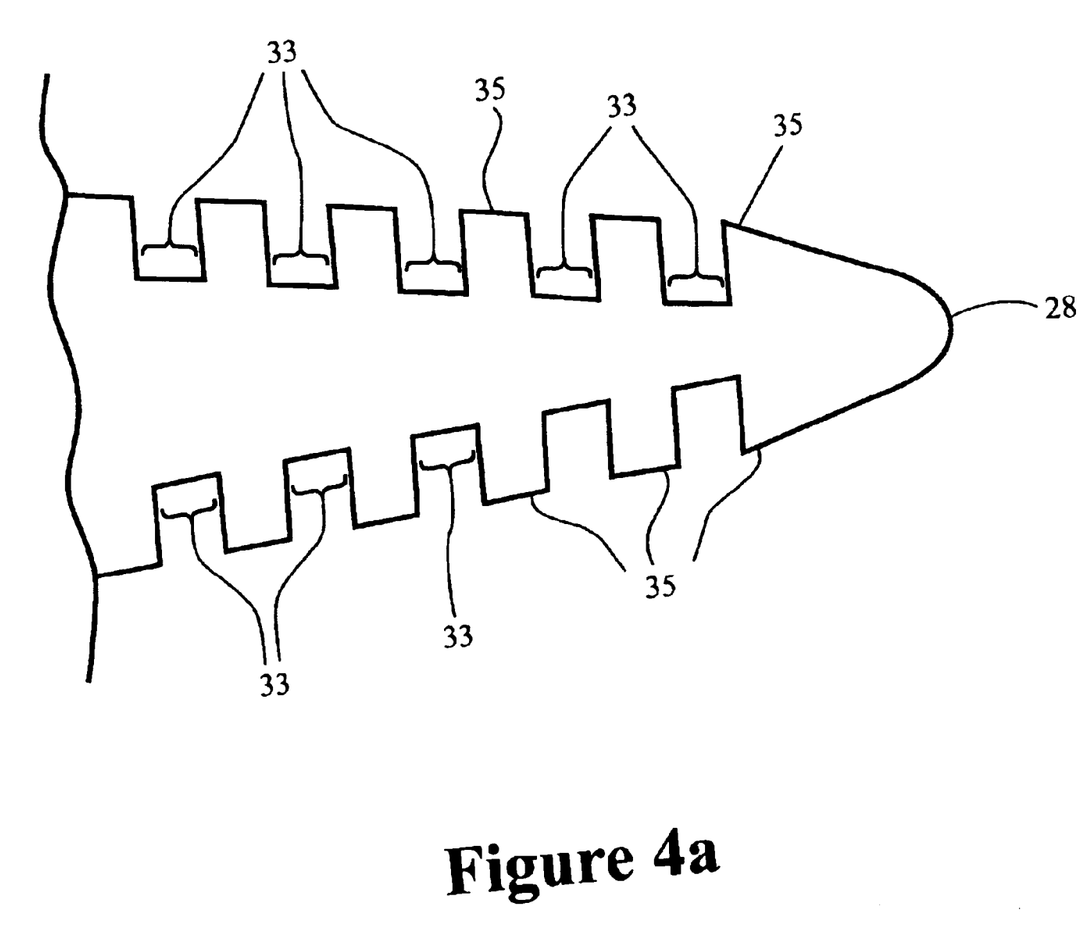
FIG. 4a is an enlarged sectional view taken along line 5 of FIG. 4.

Accordingly, and referring now to FIGS. 4 and 4a, it has been found that proper matching may be accomplished by providing grooves 33 on an outer surface 35 of the lens. Particularly, where these grooves have a period of less than one-tenth wavelength, a depth of one-quarter wavelength in the lens material, and an aspect ratio chosen to result in an average index of refraction that is equal to the square root of the index of refraction in the lens material, suitable matching occurs. Machining of the lens 28 to include grooves 33 may be easily accomplished because the lens may be composed of a material comprising a plastic as described above, and the wavelengths are long enough so that the grooves can be made with normal machine tolerances. To minimize or eliminate spherical aberrations, the lens may be formed in a hyperbolic shape such as by machining on a lathe.

Referring again to FIG. 1, the retarder 32, also may be composed of a birefringent material and, has its fast and slow axes oriented at an angle of 45 degrees to those of the retarder 24 as shown at 34. The retarder 32 may function to delay the Stokes vector components of the signal polarized parallel and perpendicular to the fast and slow axes, which in the retarder 32 are oriented at 45 degrees relative to the retarder 24.

The retarder 24 and retarder 32, are illustrated as being cascaded, and together may function as a modulator to rotate the polarization vector of the electromagnetic signal 16 to a predetermined angle dependent on an input state of polarization and thereby establish a relationship between input state of polarization and frequency.

The retarders 24 and 32, as described above, may be composed of a birefringent material that has a different index of refraction for polarization of one linear sense relative to the polarization of the orthogonal, or perpendicular sense. One suitable material has been found to be sapphire. Large single-crystal boules of sapphire, up to 30 cm in diameter, are available from S&R Rubicon of Franklin, Ill. To make a functional retarder from such a boule, the surfaces at which the radiation enters and leaves the retarder must be polished flat and the crystal must be oriented so that its fast and slow directions, corresponding to the different indices of refraction, are known.

In order to provide refractive index matching with sapphire used in the retarders 24 and 32, it has been found that the plastic material sold under the trademark Mylar, (a polyester) is suitable, since it has an index of refraction of 1.3, which is close to the square root of 1.80, the index of refraction of sapphire. Accordingly, each retarder 24, 32 may be laminated with a layer of Mylar.

It will be understood that the present invention is not limited to the presently disclosed arrangement for modulating the electromagnetic signal 16 and any suitable device which accomplishes this modulation function may be employed in the practice of the present invention.

A lens 36, similar in composition as the lens 28, may be employed for focusing the output of the retarder 32 to form a beam waist 38 which is, in turn, focused at a midpoint of a linear polarizer 40. The linear polarizer 40 functions to block all but a single polarization oriented as shown at 42. A first output 43 of the linear polarizer 40 contains a linearly-polarized modulated signal that includes an amplitude that is a function of the input polarization state and the net rotations of the polarization vector caused by the retarders as described above. The output of the polarizer 40 is a spectrum that contains the state of polarization of a target scene 44.

The linear polarizer 40 may comprise a wire grid wound on a frame. The period of the wire spacing may be less than one-eighth of a wavelength. A linear polarizer suitable for use in the practice of this invention may be obtained from Melles Griot, Inc. of Irvine, Calif. Generally, a wire grid polarizer transmits radiation polarized perpendicular to the wires and reflects radiation parallel to the wires. Accordingly, as shown in FIG. 1, the linear polarizer 40, which is oriented at an angle of 45 degrees relative to the signal path axis would then transmit horizontally-polarized signals along the same axis without attenuation and would reflect vertically-polarized signals in a direction perpendicular to that axis.

It will be appreciated that a spectrum of intensity vs wavelength is output from the polarizer 40 and an amplitude of the polarized modulated signal is now related to the input state of polarization and each input state of polarization is transmitted at a particular frequency. It is shown in the paper by Oka and Kato, described above, that the Fourier transform of such a modulated signal gives the Stokes parameters. The input to retarders 24 and 32 is a broadband signal which may be several gigahertz in bandwidth and may be randomly polarized. Random polarization, as used herein, refers to a signal that not just has an arbitrary linear (horizontal or vertical) polarization, but that signal is a random combination of linear and circular polarizations that is generally elliptical, and this polarization also changes in time and with frequency. The retardation of the retarders varies with wavelength, so that the output of the second retarder, when passed through the linear polarizer, will have maxima and minima varying as a function of the input state of polarization. Because of the orientation of the retarders 24 and 32, any component of polarization exiting the second retarder 32 that is parallel to the transmission axis of the polarizer will be transmitted and a perpendicular component will be attenuated. Since the retardation of the retarders varies with wavelength, the input to the polarizer will vary in polarization, and some portion of the electromagnetic signal will be transmitted and some portion reflected, thus giving rise to the spectrum.

For the two retarders 24, 32 and the polarizer 40 to give a spectrum at the output of the receiver, it is necessary that the two retarders 24,32 be optically thick, which, as used herein, that their thicknesses may range between approximately five (5) wavelengths thick and approximately ten (10) wavelengths thick in the direction of propagation at the electromagnetic band of interest which is preferably at the microwave frequencies. Accordingly, a polarimeter as described herein may be less difficult to implement at higher frequencies or shorter wavelengths, since the retarders will be thinner for this case, but does not preclude its application at longer wavelengths if one is willing to accept a bulkier system. Also, sapphire has large birefringence: the difference between the ordinary and extraordinary indices is $n_0-n_0=0.345$, and the average index of refraction is 1.80. It has essentially unmeasurable loss at microwave and millimeter wave frequencies. The design of a retarder made from sapphire for 225 GHz is described in detail in "An Experimental 225 GHz Pulsed Coherent Radar, by R. W. McMillan, et al., published in IEEE *Transactions on Microwave Theory and Techniques*, Vol. 39, No. 3, March 1991.

Figure 3:
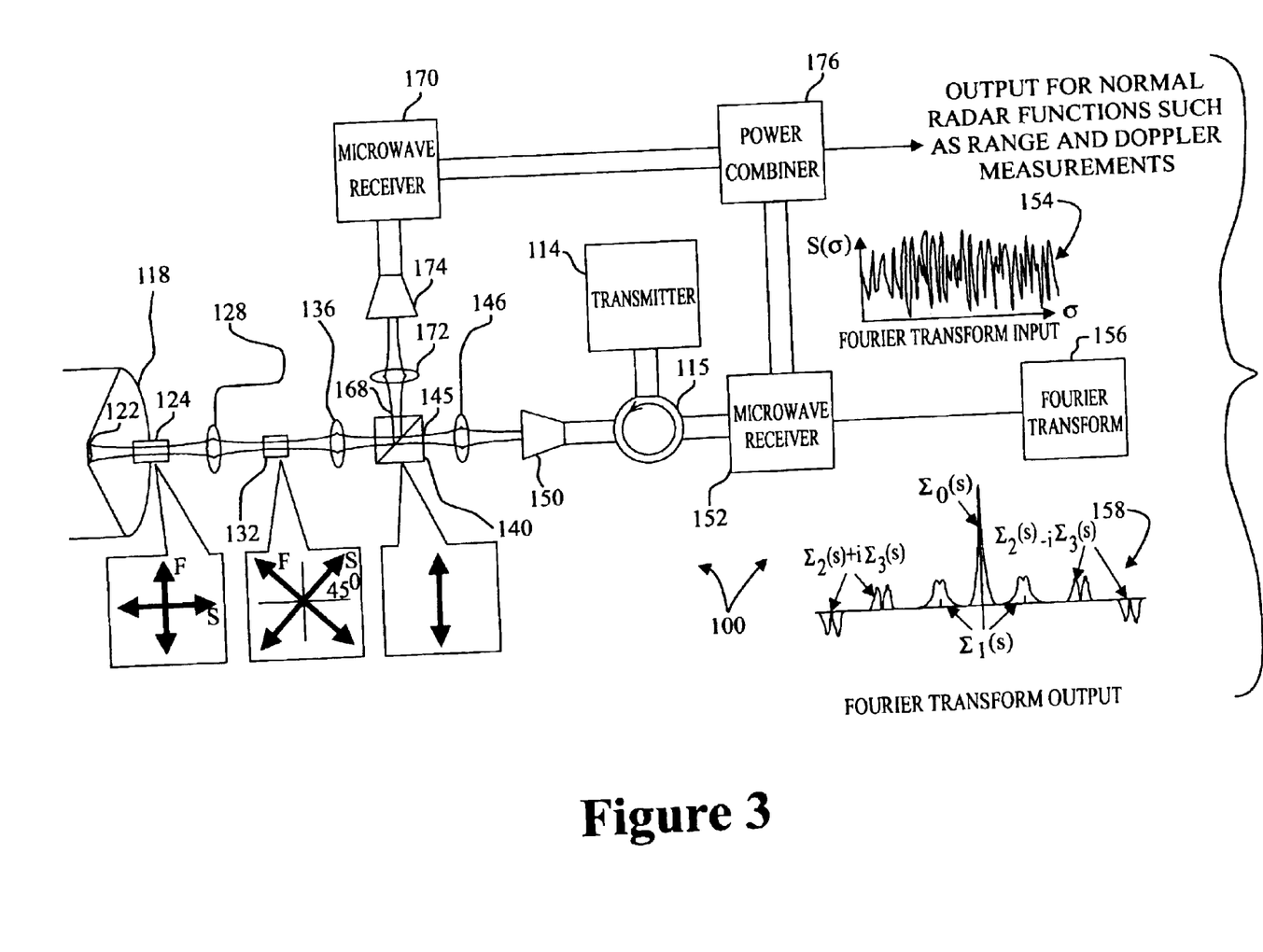
FIG. 3 is a diagrammatical view showing a polarimeter in accordance with another embodiment of the present invention wherein the polarimeter comprises a monostatic radar in which a transmitter and a receiver share a common antenna, a Fourier transform input graph and Fourier transform output graph are also shown.

In spite of the complexity of the optical train shown in FIGS. 1 and 3 and described in detail above, it will be understood that one may place all of the optical elements at a single beam waist if the depth of focus of the antenna is great enough and thereby avoid use of focusing and refocusing lenses. Also, one may avoid use of one or more of the focusing and refocusing lenses where the depth of focus of a particular lens is sufficient to carry the beam waist through the retarders and polarizer.

The single polarization of the modulated electromagnetic signal output at 43 from the polarizer 40 may be fed to a refocusing lens 46 where the resulting beam waist 48 may be captured by a horn antenna 50. A horn antenna suitable for use in the practice of the present invention also may be obtained from AdComm Inc. of Hackensack, N.J.

In accordance with a feature of the present invention, a receiver 52 which may be tuned to a microwave frequency, is connected to receive the modulated electromagnetic signal from the horn antenna 50. The receiver 52 places each spectral increment into a unique spectral bin to effect accurate spectral measurements and an output is illustrated at 54. These spectral increments may then be used as inputs to an analyzer 56, such as a computer, for taking a Fourier transform. If this operation is then performed on the output shown at 54, these components will be separated in frequency, as shown at 58.

Figure 2:
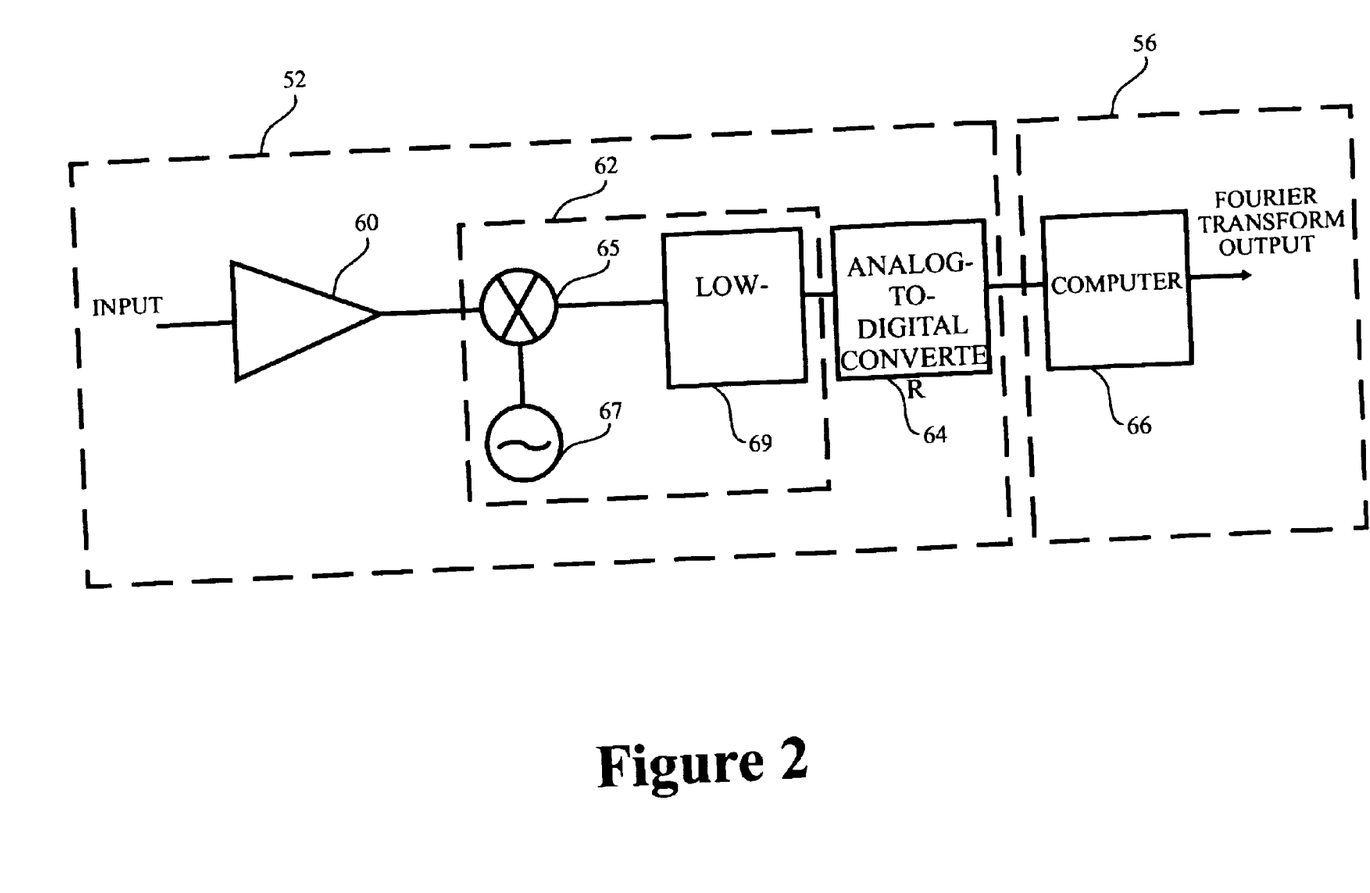
FIG. 2 is a diagrammatical view showing further details of a receiver in accordance with the embodiment of FIG. 1.

Referring now also to FIG. 2, the receiver 52 may comprise an amplifier 60, detector 62, and an analog to digital converter 64. The detector 62 comprises a mixer 65, an oscillator 67 and a low pass filter 69. The electromagnetic signal input to the receiver is amplified at 60 and input to the mixer 65 preferably employing a microwave frequency, where it is mixed with the oscillator 67 which is preferably a swept frequency oscillator configured to cover the same band as the input signal. The result is a signal at baseband (DC) that fluctuates in amplitude as a function of the input frequency. Since this frequency is known, a spectrum is generated whose precise dependence on frequency is known. Suitable mixers are made by California Eastern Laboratories of Santa Clara, Calif., and a suitable swept oscillator and suitable filters are made by Comstron Laboratories of Plainview, N.Y. This approach to frequency determination is well known and has been available to microwave engineers for many years.

A computer 66 including a processor may be employed which is programmed in a known manner to carry out the known steps of Fourier transformation thereby providing the components of the Stokes vector. In an embodiment utilizing, e.g., the 8 to 12 GHz microwave band, the amplifier 60 may comprise a microwave amplifier such as the Model AF S08501160-09-10P-4manufactured by Miteq Inc. of Hauppauge, N.Y. The amplifier 60 may be in circuit with the detector 62 which may function to measure the power output of the amplifier. A suitable detector may be the Model HP 8471E manufactured by the Hewlett Packard Company of Palo Alto, Calif. Note that as the frequency of the receiver 52 is varied over its bandwidth range, the output of the detector 62 will vary according to the polarization state of the incoming modulated electromagnetic signal, thus tracing out the desired spectrum, which is simply the variation in intensity of the incoming signal, caused by polarization, as a function of the original electromagnetic signal frequency. The output of the detector 62 is fed into an analog-to-digital converter ("ADC") 64 that converts each signal level into a digital word. One ADC found to be suitable for practice in the present invention is type AD10200 manufactured by Analog Devices, Inc. located in Wilmington, Mass. The digital data output by the ADC 64 is processed by a computer 66 that generates its Fourier transform using any one of several software packages, such as MATLAB™ developed by The Mathworks of Natick, Mass. From this Fourier transform, the components of the Stokes polarization vector are output as shown at 58 in FIG. 1 and may be used, for example, in target discrimination. This process for ascertaining the Stokes polarization components is described in detail by Oka and Kato in the paper entitled "Spectroscopic Polarimetry with a Channeled Spectrum" by Kazuhiko Oka and Takayuki Kato, published in *Optics Letters*, Vol. 24, No. 21, Nov. 1, 1999, described above, and which is hereby incorporated herein by reference to the extent necessary to make and use the present invention.

Referring again to FIG. 1, the polarizer 40 may comprise a second output 68 for the modulated electromagnetic signal. The signal output at 68 is polarized orthogonal to that of the modulated electromagnetic signal output at 43. The orthogonally-polarized signal output at 43 may be captured at a second receiver 70 after passage through a refocusing lens 72 and a horn antenna 74. It will be appreciated that the second receiver may be any suitable radar receiver and the refocusing lens 72 and the horn antenna 74 may be similar to those described above. The two receivers 52 and 70 may each communicate with a power combiner 76 via pathways 78 and 80 such that the orthogonally polarized signals may then be combined. A suitable power combiner may be purchased from Mini-Circuits of Brooklyn, N.Y.

It will be understood that if only one output of the linear polarizer 40 is passed to a receiver, half of the original electromagnetic signal is lost. More importantly, the portions of the signal that are lost may correspond to important radar returns at the frequency at which the signal is transmitted. Accordingly and to prevent such loss, the two polarization components that are separated by the linear polarizer 40 and amplified in the first stages of the horizontal and vertical receivers 52 and 70 are recombined to give a radar signal which may be subsequently processed by methods normally used for such processing to extract target range, Doppler information and/or scene temperature measurements. In this way, the added polarization discrimination capability of the radar/radiometer is an additional feature that does not interfere with conventional radar system operation. Indeed, as described above, the knowledge of the full Stokes vector as ascertained in accordance with the present invention is an especially powerful discrimination technique whereby electromagnetic signal reflected from a particular target of interest in a target scene may be separated from clutter and jammers in both active and passive systems employing, for example, microwave frequencies.

The transmitter 14 may be employed in the practice of the present invention to illuminate the target scene 44 with an electromagnetic signal 82 in which case a bistatic radar is provided rather than a monostatic radar. A monostatic radar uses a common antenna for both transmit and receive functions and another embodiment of the present invention illustrating a monostatic radar is described below in connection with FIG. 3.

As seen in FIG. 1, the transmitter 14 may comprise a conventional transmitter, such as available from the Raytheon Corporation of Bedford, Mass., Lockheed Martin of Moorestown, N.J., and Northrop Grumman of Baltimore, Md., and may include a horn 84 and an antenna 86 for radiating the electromagnetic signal 82.

FIG. 3 illustrates another embodiment of the present invention wherein a polarimeter 100 is configured as a monostatic radar. As shown, the polarimeter 100 may be arranged and may function similar to the polarimeter 10 described above, excepting that a transmitter 114 and a circulator 115 are located between a horn antenna 150 and a receiver 152. The transmitted signal follows the same path as the received signal, being focused and re-focused by lenses (128, 136 and 146) and passing through a linear polarizer 140 and a pair of retarders before passing a lens 122 and being focused into the antenna 118 and radiated. The electromagnetic signal output of the transmitter is preferably polarized so that passage through the linear polarizer 140 has no effect on it. Passage through the retarder 132 for which the fast and slow axes are at 45 degrees to the linear polarizer 140 rotates the polarization vector of the transmitted signal to some angle that is analytically dependent on its wavelength and-delays the components of the polarization vector along the two orthogonal axes of the retarder relative to each other. Subsequent passage through the retarder 124 with axes oriented vertically and horizontally rotates the two components delayed by the first retarder relative to each other to other angles analytically dependent on wavelength. The output of the radar is then polarized with a spectrum of polarizations, generally elliptical, dependent on wavelength, and the analytical nature of this approach provides the means to calculate this polarization state for each transmitted wavelength. In particular, It will be understood that since the vector components of the transmitted electromagnetic signal 82 are known and a transformation matrix may be prepared knowing the particularly pertinent parameters of the retarders 124 and 132, the vector components of the electromagnetic signal expected to be received may be calculated. As described below, the target may change or modulate these components to give a signature that is unique to that target. The vector components of the received signal may be measured by the receiver and this polarization signature may then serve as a discriminant.

The electromagnetic signal reflected from the target is collected by the antenna 118 which focuses it into the retarder 124. The lens 128 refocuses the electromagnetic signal into another retarder 132, and another lens 136 collects the electromagnetic signal output from the second retarder 132 and focuses the signal into the linear polarizer 140. The linear polarizer 140, similar to the linear polarizer 40 described above, has two outputs 143,168 corresponding to horizontally and vertically polarized signals. The horizontal path is described first. The output of the linear polarizer 140 is focused into a horn antenna 150 which is preferably configured to accommodate microwave frequencies, passes through the circulator 115 and is collected by the receiver 152. The circulator 115 may take input from one port and outputs it to the next sequential port in a counter-clockwise direction. Accordingly, an electromagnetic signal from the antenna 150 thus passes into the receiver 152 and not into the transmitter 114, while the electromagnetic signal from the transmitter passes into the antenna 150 and not into the receiver 152. A suitable circulator may be purchased from many sources, including Alcatel Network Systems of San Jose, Calif. The receiver 152 preferably functions similar to the receiver 52 described above in connection with FIGS. 1 and 2. The output of the receiver 152 is shown at 156 and labeled as the Fourier transform input. The Fourier transform of the output shown at 156 yields the vector components described above and as shown at 158 labeled as the Fourier transform output.

The output 168 of the linear polarizer 140 may be collected by the horn 174 after passing lens 172 and passes into the receiver 170 and to a power combiner 176. Similar to the arrangement shown in FIG. 1, the output of the receiver 170 may be combined with that of receiver 152 in the power combiner 176 to give the sum of the two orthogonally opposed signals which may be used, as described above, to obtain additional radar measurements such as target range, Doppler information andlor scene temperature measurements.

In all targets there will be some degree of depolarization characteristic of the target, which is a measure of the polarization signature of the target. These sometimes subtle and ordinarily undetectable depolarization components in the signal reflected from the target will be detected by receiver 52,152 and the Fourier transform operation 56,156, and will be useful in discriminating targets from clutter and jammers in the radar embodiment of the present invention. The computer 66, shown in FIG. 2, may be programmed to identify differing targets based on depolarization components in order to identify a target signature.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

What is claimed is:

1. A polarimeter for measuring a polarization state of a wideband electromagnetic signal, the polarimeter comprising:
   a first antenna for receiving the electromagnetic signal;
   a modulator interconnected with the first antenna for modulating the electromagnetic signal whereby a modulated electromagnetic signal results which contains a different polarization state for each frequency of the electromagnetic signal with the amplitude of each frequency component of the modulated electromagnetic signal being a function of the particular polarization state of each frequency component of the electromagnetic signal, the modulator being configured to modulate at a radar frequency;
   a linear polarizer configured to pass a first predetermined polarization of the modulated electromagnetic signal through a first output thereof; and
   a first receiver comprising a detector for receiving and demodulating the modulated electromagnetic signal from the linear polarizer.

2. The polarimeter of claim 1, further comprising:
   an analog to digital converter operatively connected to the detector for converting the demodulated electromagnetic signal into a digital word; and
   a processor configured to receive the digital word and calculate at least one component of a Stokes polarization vector of the electromagnetic signal.

3. The polarimeter of claim 2, wherein the modulator comprises:
   a first optically thick retarder of birefringent material wherein a fast and a slow axes of the retarder define respective x and y axes of a rectangular coordinate system; and
   a second optically thick retarder of birefringent material and wherein the fast axis of the first optically thick retarder forms an angle of approximately forty-five degrees to the fast axis of the second optically thick retarder.

4. The polarimeter of claim 3, wherein the first and second optically thick retarders are coated with a material comprising MYLAR.

5. The polarimeter of claim 2, wherein the processor applies a Fourier transform to the digital word.

6. The polarimeter of claim 3, further comprising a second antenna located between the linear polarizer and the first receiver.

7. The polarimeter of claim 6, wherein the second antenna comprises a horn antenna.

8. The polarimeter of claim 6, further comprising:
   at least one focusing lens and at least one re-focusing lens that are interleaved with the first and second optically thick retarders, the linear polarizer and/or the second antenna; and
   an amplifier operatively connected in circuit with the second antenna.

9. The polarimeter of claim 8, wherein the at least one focusing lens and the at least one refocusing lens each comprise a surface having a groove.

10. The polarimeter of claim 1, wherein the linear polarizer comprises a wire grid.

11. A method for measuring the polarization state of a wideband electromagnetic signal, the method comprising:
    receiving the electromagnetic signal;
    modulating the electromagnetic signal to obtain a modulated electromagnetic signal containing a different polarization state for each frequency of the electromagnetic signal with the amplitude of each frequency component of the modulated electromagnetic signal being a function of the particular polarization state of each frequency component of the electromagnetic signal, the electromagnetic signal being modulated at a microwave frequency;
    linearly polarizing the modulated electromagnetic signal; and demodulating the modulated electromagnetic signal output from the linear polarizer.

12. The polarimeter of claim 6, wherein the linear polarizer is configured to pass a second predetermined polarization of the modulated electromagnetic signal through a second output thereof.

13. The polarimeter of claim 12, further comprising:
    a transmitter for transmitting the electromagnetic signal for reflection from a target;
    a circulator interconnected with the transmitter, the second antenna and the first receiver;
    a second receiver employed to receive the second predetermined polarization of the modulated electromagnetic signal; and
    a power combiner employed to combine the modulated electromagnetic signal received by each of the first and second receivers.

14. The polarimeter of claim 12, further comprising a transmitter for transmitting the electromagnetic signal and wherein the processor further calculates a degree of depolarization of the electromagnetic signal identifiable as a target signature.

15. The polarimeter of claim 13, wherein the processor further calculates a degree of depolarization of the electromagnetic signal identifiable as a target signature.

16. The polarimeter of claim 15, wherein the power combiner outputs the combined modulated electromagnetic signal which is used to determine at least one of a target range, a Doppler measurement and a temperature.

17. The polarimeter of claim 15, wherein the electromagnetic signal is within the radar band.

18. The polarimeter of claim 15, wherein the electromagnetic signal comprises a microwave frequency.

19. A target discriminator for measuring the polarimetry of a wideband electromagnetic signal reflected from a target, the target discriminator comprising:
    a first antenna for receiving the electromagnetic signal;
    a modulator interconnected with the first antenna for modulating the electromagnetic signal, the modulator comprising:

a first optically thick retarder of birefringent material wherein a fast and a slow axes of the first optically thick retarder define respective x and y axes of a rectangular coordinate system; and a second optically thick retarder of birefringent material and wherein the fast axis of the first optically thick retarder forms an angle of approximately forty-five degrees to the fast axis of the second optically thick retarder;

a linear polarizer configured to pass a first predetermined polarization of the modulated electromagnetic signal through a first output thereof and to pass a second predetermined polarization of the modulated electromagnetic signal through a second output thereof;

a first receiver comprising a detector for receiving and demodulating the modulated electromagnetic signal from the linear polarizer;

an analog to digital converter operatively connected to the detector for converting the demodulated electromagnetic signal into a digital word;

a processor configured to receive the digital word and calculate at least one component of a Stokes polarization vector of the electromagnetic signal and wherein the processor further calculates a degree of depolarization of the electromagnetic signal identifiable as a target signature; and the target discriminator further comprising:

a transmitter for transmitting the electromagnetic signal;

a second receiver employed to receive the second predetermined polarization of the modulated electromagnetic signal; and a power combiner employed to combine the modulated electromagnetic signal received by each of the first and second receivers.

20. A polarimeter for measuring the polarization state of a wideband electromagnetic signal, the polarimeter comprising:

means for receiving the electromagnetic signal;

means for modulating the electromagnetic signal being interconnected with the receiving means whereby a modulated electromagnetic signal results which contains a different polarization state for each frequency of the electromagnetic signal with the amplitude of each frequency component of the modulated electromagnetic signal being a function of the particular polarization state of each frequency component of the electromagnetic signal, the modulator being configured to modulate at a microwave frequency;

means for linearly polarizing the modulated electromagnetic signal; and means for demodulating the modulated electromagnetic signal output from the linear polarizer.

21. The polarimeter of claim 20, wherein the modulator means comprises:

a first optically thick retarder of birefringent material wherein a fast and a slow axes of the retarder define respective x and y axes of a rectangular coordinate system; and a second optically thick retarder of birefringent material and wherein the fast axis of the first optically thick retarder forms an angle of approximately forty-five degrees to the fast axis of the second optically thick retarder.

* * * * *